United States Patent [19]

Hibi et al.

[11] Patent Number: 4,613,034
[45] Date of Patent: Sep. 23, 1986

[54] APPARATUS FOR CONVEYING CORRUGATED MEMBERS

[75] Inventors: Yasuo Hibi, Ohbu; Tadahiko Shibata, Aichi; Takatoshi Iwase, Anjo, all of Japan

[73] Assignee: Nippondenso Co., Ltd., Kariya, Japan

[21] Appl. No.: 753,621

[22] Filed: Jul. 9, 1985

[30] Foreign Application Priority Data

Jul. 10, 1984 [JP] Japan ............... 59-141374

[51] Int. Cl.$^4$ .................................. B65G 37/00
[52] U.S. Cl. ........................ 198/465.1; 198/731
[58] Field of Search ............ 198/465.1, 465.3, 803.01, 198/803.2, 779, 731

[56] References Cited

U.S. PATENT DOCUMENTS

| | | | |
|---|---|---|---|
| 2,802,559 | 8/1957 | Hauck | 198/465.3 |
| 3,057,456 | 10/1962 | Heinzer | 198/731 |
| 3,630,502 | 12/1971 | Schmidt | 198/465.1 |
| 4,162,723 | 7/1979 | Kupper | 198/465.1 |
| 4,486,933 | 12/1984 | Iwase et al. | 29/157.3 A |

FOREIGN PATENT DOCUMENTS 2306712 8/1974 Fed. Rep. of Germany ........... 198/803.01
3029620 3/1982 Fed. Rep. of Germany ... 198/803.2

*Primary Examiner*—Joseph E. Valenza
*Attorney, Agent, or Firm*—Cushman, Darby & Cushman

[57] ABSTRACT

An apparatus for conveying continuous corrugated members including a guide plate having receiving and discharging ends of the corrugated members, a pair of guide rails located at the lateral opposite sides of the guide plate, conveyance bars having rolling wheels which can roll on the guide rails and flanges for providing predetermined space between the adjacent conveyance bars, a device for feeding the corrugated members onto the receiving end of the guide plate one by one, endless chains for causing the rolling wheels to continuously rotate on the guide rails in order to roll the rolling wheels on the guide rails, and a bar receiving device provided at the discharging end of the guide plate.

10 Claims, 15 Drawing Figures

APPARATUS FOR CONVEYING CORRUGATED MEMBERS

BACKGROUND OF THE INVENTION

1. Field of the Invention

The present invention relates to an apparatus for conveying corrugated, members, cut to predetermined lengths to have a predetermined number of crests, one by one in a direction perpendicular to the length of the corrugated members. In particular, the present invention relates to a conveying apparatus of corrugated members wherein the corrugated members can be stocked on the downstream side, i.e., the discharging side of the apparatus.

2. Description of the Related Art

Corrugated members having a predetermined length and a predetermined number of crests are used as corrugate fins for automobile radiators, automobile heaters, condensers in cooling apparatuses of automobiles, or other heat exchangers, or the like.

For example, in a radiator core assembly line, fins are discharged one by one from a fin forming apparatus, in which relatively weak corrugate fins having a predetermined number of crests are continuously made. The fins discharged from the fins forming apparatus are fed one by one into a core assembly apparatus by means of a fin feeding apparatus. Between the fin feeding apparatus and the fin forming apparatus is provided a fin conveying apparatus which conveys the fins one by one.

It should be noted that the time interval or timing at which the corrugate fins are discharged from the fin forming apparatus may vary in accordance with variations of the operational speed of the fin forming apparatus or the occasional need to remove defective fins from the fin forming apparatus. In addition, that time interval or the timing at which the fins are fed from the fin feeding apparatus to the core assembly apparatus may also vary in accordance with the operational speed of the core assembly apparatus or temporary interruption of the operation due to rearrangement of the core assembly apparatus. Under these circumstances, it is desired to temporary stock the fins in front of the fin feeding apparatus in order to ensure smooth feed of the fins into the fin feeding apparatus. In the case of a belt conveyer, which is usually used as the conveying means between the fin forming apparatus and the fin feeding apparatus, it is impossible to stock the corrugate fins in front of the fin feeding apparatus.

There is also known a fin conveying apparatus in which the fins are conveyed in the longitudinal direction of the fins along and on a chute having a guide passage by means of an air blow. In this known apparatus, it is necessary to provide a long space in the chute in order to stock the fins in front of the fin feeding apparatus. Furthermore, it is very difficult to feed stocked fins having different lengths one by one from the conveying apparatus into the feeding apparatus.

SUMMARY OF THE INVENTION

The primary object of the present invention is to provide an improved apparatus for conveying corrugated members, such as corrugate fins which are continuously fed from an upstream station, such as a fin making apparatus, into a downstream station, such as a fin feeding apparatus, which conveying apparatus allows the corrugated members to be discharged therefrom one by one and also to be stocked, when necessary.

To achieve the object of the present invention mentioned above, according to the present invention, there is provided an apparatus for conveying corrugated members comprising a guide plate which has a receiving end for receiving the corrugated members and a discharging end for discharging the corrugated members which are conveyed on the guide plate from the receiving end to the discharging end, a pair of guide rails which are located at the lateral opposite sides of the guide plate and which extend in parallel with the guide plate, a number of conveyance bars which extend in a direction perpendicular to the conveyance direction of the corrugated members and which are provided, on their opposite ends, with rotatable rolling wheels which can roll on the associated guide rails and with flanges which are adapted to provide a predetermined space between the adjacent conveyance bars when the adjacent flanges of the adjacent conveyance bars come into contact with each other, a bar feeding device for feeding the corrugated members onto the receiving end of the guide plate one by one to put the rolling wheels of the conveyance bars on the corresponding guide rails, means provided on the lateral sides of the guide plate for causing the rolling wheels to continuously rotate on the guide rails in order to roll the rolling wheels on the guide rails, thereby to move the conveyance bars along the guide plate in the direction perpendicular to the length of the corrugated members, resulting in the movement of the corrugated members by the associated conveyance bars in the same direction, a bar receiving device provided at the discharging end of the guide plate for receiving the frontmost conveyance bars to bring the same beneath the guide plate, and means for returning the conveyance bars brought beneath the guide plate to the bar feeding device. Preferably, means are located in the vicinity of the receiving end of the guide plate for successively feeding the corrugated members onto the receiving end of the guide plate.

With the arrangement mentioned above, during the abutment of the frontmost conveyance bar against the workpiece receiving device at the other end of the workpiece guide plate, the flanges of the subsequent conveyance bars come into abutment with the flanges of the preceding conveyance bars, so that the subsequent conveyance bars are successively forced into a stop, resulting in stocking of the corrugated members between the associated conveyance bars. During the stocking of the corrugated members, the rolling wheels of the conveyance bars which are forced to stop continue to rotate idly on the guide rails. When the frontmost conveyance bar moves beneath the workpiece guide plate with the help of the bar receiving device, the subsequent conveyance bars start moving. Since the distance between the adjacent conveyance bars is kept constant due to the abutment of the flanges of the adjacent conveyance bars, no external excess force is applied to the corrugated members between the adjacent conveyance bars, so that the corrugated members can be prevented from being deformed or destroyed. Thus, the corrugated members, which are relatively weak and which have a predetermined nubmer of crests, can be stably conveyed one by one in the direction substantially perpendicular to the length of the corrugated members and can also be stocked when the frontmost conveyance bar stops moving.

BRIEF DESCRIPTION OF THE DRAWINGS

The invention will be described below in detail with reference to the drawings, which show preferred embodiments of the present invention, in which.

DESCRIPTION OF THE PREFERRED EMBODIMENTS

Figure 1:
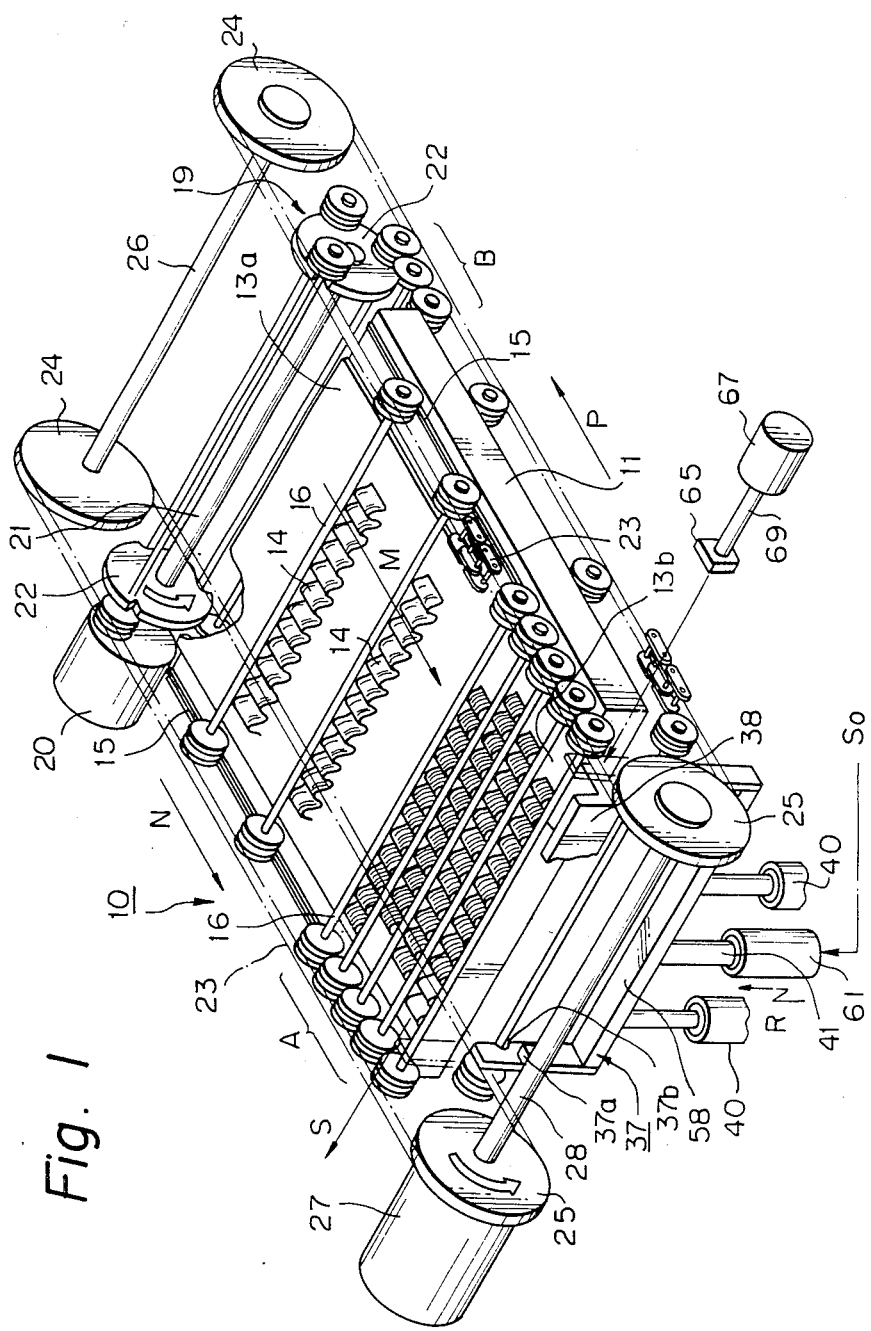
FIG. 1 is a perspective view of a conveying apparatus of corrugated members according to the present invention.

FIGS. 1 to 9 show a first embodiment of the present invention. In these figures, a conveyance apparatus of the present invention is designated generally as 10. The conveyance apparatus 10 of corrugated members, such as corrugate fins, has a workpiece guide plate 13 which is mounted to a stationary base 11 through a spacer 12 and which substantially extends in the horizontal direction. The guide plate 13 has, at its one end, a receiving end 13a which receives corrugated members 14 and, at the opposite side, a discharging end 13b which discharges the corrugated members 14 from the guide plate 13. Preferably, the upper surface of the guide plate 13 is surface treated, such as surface hardened, for example, by coating with hard chrome plating or the like, to decrease the friction resistance against the movement of the corrugated members on the guide plate 13, i.e., to ensure smooth movement of the corrugated members on the guide plate 13. The guide plate 13 is provided on its lateral sides, with a pair of guide rails 15 which extend in a direction parallel to the guide plate 13 and which are secured on and to the base 11.

Figure 7:
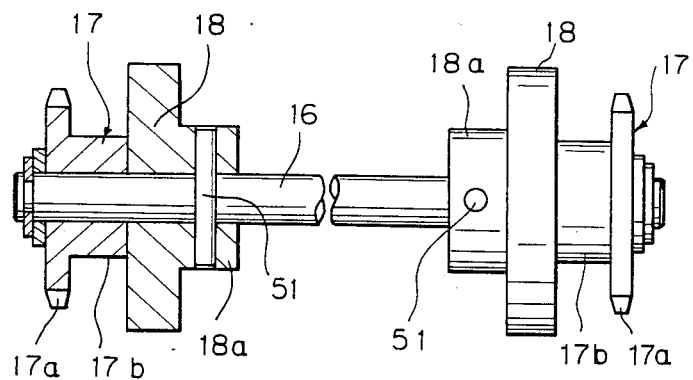
FIG. 7 is a partially sectioned front elevational view of a conveyance bar, rolling wheels, and flanges of the apparatus shown in FIG. 1.

Each of a large number of conveyance bars 16 has a pair of rolling wheels 17 which are rotatably supported by the opposite ends of the associated conveyance bars 16, as shown in FIG. 7. In this embodiment, each wheel 17 has a sprocket 17a and a boss 17b integral therewith. The bosses 17b of the wheels 17 can roll and move on the associated guide rails 15.

Each of the conveyance bars 16 has a pair of flanges 18 in the vicinity of the opposite ends thereof. The flanges 18 are secured to the bars 16 by means of knock pins 51 so as to rotate together with the bars 16 and, accordingly, the wheels 17. The flanges 18 exhibit a circular profile having a diameter so that when the adjacent flanges 18 of the two adjacent conveyance bars 16 come into contact with each other, a space which has a width larger than that of one corrugated member 14 located between the adjacent flanges is provided between the flanges 18.

A workpiece feeding device 19 is provided in the vicinity of the receiving end 13a of the workpiece guide plate 13 to feed the conveyance bars 16 onto the receiving end 13a of the guide plate 13 one by one in order to put the bosses 17b onto the guide rails 15. The workpiece feeding device 19 has a step motor 20 and a pair of drums 22 which are connected to a drive shaft 21 which is in turn connected to the step motor 20 so as to rotate therewith. As can be seen from FIG. 5, the drums 22 have peripheral grooves 22a provided on the outer peripheries of the drums. Preferably, the grooves 22a are spaced at equiangular distances from one another. The grooves 22a can be engaged by bosses 18a of the flanges 18 of the bars 16, so that the bars 16 which engage with the associated grooves 22a which are located at a lowermost position can be brought to an uppermost position and then fed onto the receiving end 13a of the guide plate 13 one by one when the drums 22 rotate in a counter clockwise direction in FIG. 5.

As can be seen in FIG. 1, the conveyance apparatus 10 has means for causing the wheels 17 of the bars 16 located on the guide rails 15 to continuously rotate in order to roll the wheels 17 along and on the guide rails 15, thereby to move the bars 16 on the guide plate 13. In this embodiment, the means for causing the wheels to continuously rotate is composed of a pair of endless chains 23 which are engaged by the sprockets 17a of the wheels 17. The chains 23 can be replaced by toothed belts, V-belts, or the like. The endless chains 23 extend around pairs of sprocket wheels 24 and 25 which are located on the receiving and discharging ends 13a and 13b of the guide plate 13 and on the opposite lateral sides of the guide plate 13, respectively. The two sprocket wheels 24 located on the sides of receiving end 13a of the guide plate 13 are mounted to a rotatable shaft 26, and the two sprocket wheels 25 located on the side of the discharging end 13b of the guide plate 13 are connected to a drive shaft 28 of a drive motor 27. When the sprocket wheels 25 are driven to rotate in the counter clockwise direction in FIG. 1, the chains 23 move in the direction N from the receiving end 13a toward the discharging end 13b above the guide plate 13, and in the direction P opposite to the direction N, below the guide plate 13, respectively, while engaging the sprockets 17a.

Figure 2:
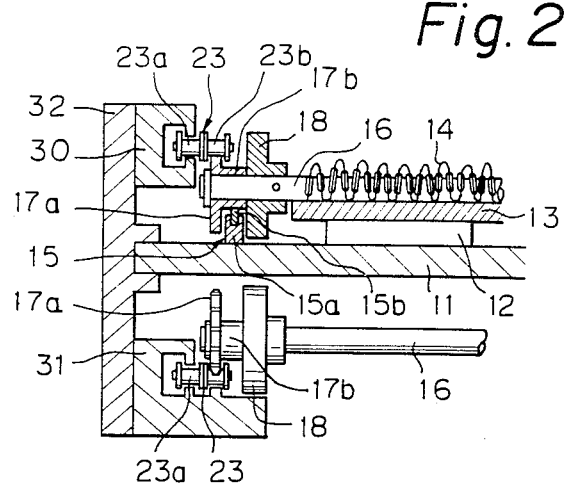
FIG. 2 is a cross-sectional view of a main part of the apparatus shown in FIG. 1.
Figure 3:
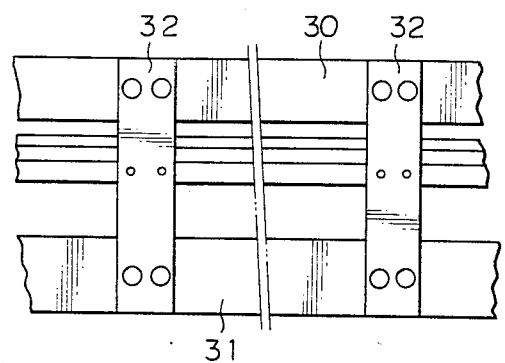
FIG. 3 is a side elevational view of a main part of the apparatus shown in FIG. 1.
Figure 4:
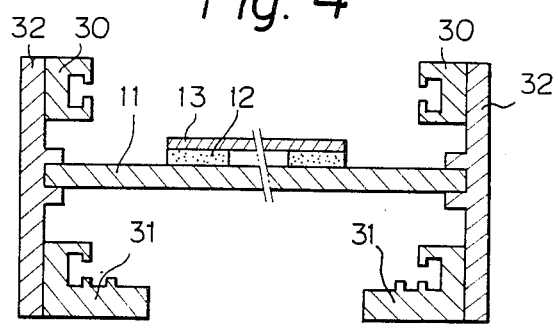
FIG. 4 is a cross-sectional view of a guide member of the apparatus shown in FIG. 1.

As shown in FIGS. 2 to 4, guide members 30, 31 are provided on the opposite lateral sides of the guide plate 13 and above and below the base 11 to guide the chains 23 in parallel to the workpiece guide plate 13. The guide members 30, 31 are secured to supports 32 which are in turn secured to the base 11. As can be seen from FIG. 2, each chain 23 is composed of two rows of chain elements, outer rollers 23a of which are held by and in the corresponding guide members 30, 31 and are engaged by the sprocket wheels 24 and 25. The inner rollers 23b of the two rows chains 23 are engaged by the sprockets 17a of the conveyance bars 16.

When the chains 23 which engage with the sprockets 17a of the bars 16 move from the side of the receiving end 13a toward the discharging end 13b of the guide plate 13, the sprockets 17a of the bars 16 can be rotated. As a result, the bosses 17b roll on the guide rails 15, and the conveyance bars 16 move from the receiving end 13a toward the discharging end 13b of the guide plate 13 along the guide plate 13.

To increase the frictional resistance between the guide rails 15 and the rolling wheels 17, the guide rails 15 are provided with grooved holders 15a and elastic elements 15b which are fit in the upper grooves of the holders 15a as shown in FIG. 2. The elastic elements can be made of resilient material, such as rubber. Alternatively, it is also possible to provide a spring means for elastically pressing the guide rails 15 against the bosses 17b of the rolling wheels 17 of the conveyance bars 16.

The movement of the conveyance bars 16 causes the associated corrugated members 14 fed on the receiving end 13a of the guide plate 13 to move toward the discharging end 13b of the guide plate 13.

As can be seen in FIG. 1, the conveyance apparatus has a workpiece feeding device 33 for feeding the corrugated members 14 onto the receiving end 13a of the guide plate 13 in a direction perpendicular to the length of the corrugated members 14 in the vicinity of the receiving end 13a of the guide plate 13. In this embodiment, the feeding device 33 is composed of a drum 34, which is connected to a step motor 55, and a chute 35, which receives the corrugated members discharged from the drum 34. The drum 34 is provided on its outer periphery with a plurality of grooves 34a which are preferably spaced at an equiangular distance, for example, 90 degrees, and which extend in the axial direction of the drum 34. Each of the grooves 34a has one open end through which the corrugated member 14 can be inserted in the associated grooves 34a. The corrugated members 14, which are successively made by a corrugated member forming device (not shown) and which have a predetermined length with a predetermined number of crests, are successively discharged from the corrugated member forming device after they are subjected to contraction treatment in which the distances between the adjacent crests of the corrugated members are reduced by a predetermined amount. The discharged corrugated members are brought into the associated grooves 34a of the drum 34 by means of a conveyer belt 36 which extends in a direction parallel to the axial direction of the corrugated members and, accordingly, of the drum 34. Note that the drum 34 and the motor 55 are drawn as a perspective view in FIG. 8 for the purpose of clarification of the grooves 34a of the drum 34.

It is also possible to provide a means for selecting and discharging defective corrugated members from the drum 34 without feeding them onto the guide plate 13. Such a selecting and discharging means is, for example, composed of a discharging chute 57 which extends, for example, in symmetry with the inclined chute 35 in the opposite direction, so that the defective corrugated members which are not in a permissible range of length or number of crests can be discharged onto the inclined chute 57 by reversing the drum 34. To this end, the drum 34 can rotate either in a clockwise direction or a counter clockwise direction in accordance with a detection signal from a detector (not shown) for detecting the length or the number of the crests of the products, i.e., the corrugated members 14.

Figure 8:
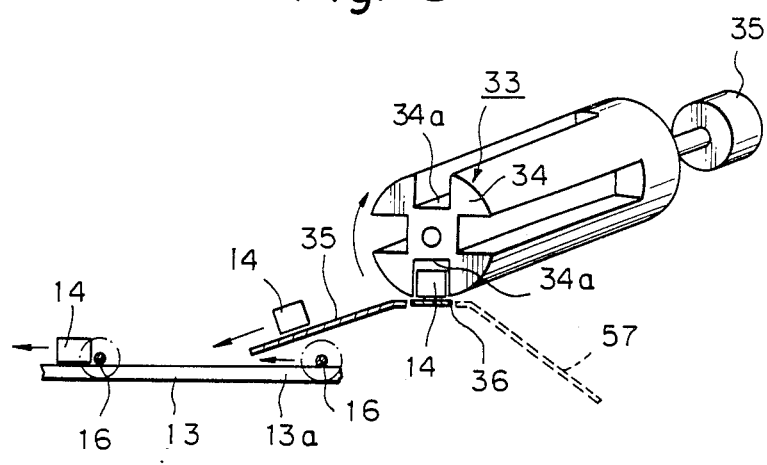
FIG. 8 is a partially sectioned side elevational view of a workpiece feeding device of the apparatus shown in FIG. 1.

The products 14 which have been inserted in the lowermost groove 34a of the drum 34 are discharged therefrom and are brought onto the inclined chute 35 when the drum 34 rotates in the clockwise direction in FIG. 8. The products slide on and along the chute 35 and fall down onto the receiving end 13a of the guide plate 13. The corrugated members 14 are brought onto the guide plate 13 substantially in parallel with the conveyance bars 16.

Figure 5:
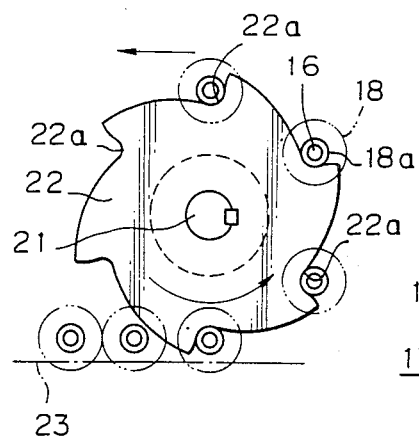
FIG. 5 is a side elevational view of a main part of a bar feeding device of the apparatus shown in FIG. 1.
Figure 6:
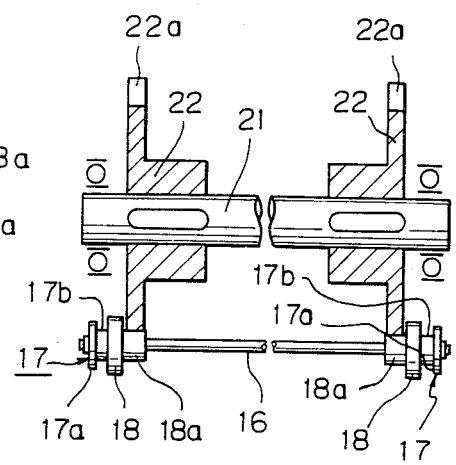
FIG. 6 is a sectional view of a bar feeding device of the apparatus shown in FIG. 1.

The bar feeding device 19 mentioned above rotates by a predetermined angle (60° in this embodiment) in the counter clockwise direction in FIG. 5, synchronously with the rotation of the drum 34 in the clockwise direction, so that one conveyance bar 16 comes directly behind the corrugated member 14 which is fed on the receiving end 13a of the guide plate 13. "Behind" referred to means behind viewed in the direction of the movement of the bars 16 in the arrow M in FIG. 1. The conveyance bars 16 which are fed on the receiving end 13a of the guide plate 13 are moved in the direction M in FIG. 1 by means of the chains 23, so that the corrugated members 14 can be moved in the same direction by the associated conveyance bars 16 located behind them. During the movement of the corrugated members 14, they maintain their original posture in which they linearly extend substantially parallel to the conveyance bars 16 which in turn extend perpendicular to the direction M of the movement of the bar 16 and the corrugated members 14. The corrugated members 14 are finally discharged from the guide plate 13 at the discharging end 13b thereof.

The conveyance apparatus 10 of the present invention has a bar receiving device 37 which receives the frontmost conveyance bars 16 at the discharging end 13b of the guide plate 13 to carry the bars beneath the guide plate 13. The apparatus also has a means for returning the bars which are carried beneath the guide plate 13 into the bar feeding device 19. The bar returning means mentioned above is, in this embodiment, composed of the portions of the endless chains 23 that are located beneath the guide plate 13. Namely, the bars 16 are conveyed beneath the bar feeding device 19 by means of the chains 23 and the frontmost bar 16 first comes into contact with the periphery of the drum 22 and stops moving. After the frontmost bar 16 stops, the subsequent bars successively stop moving. Thus, the bars 16 are stocked in the area B shown in FIG. 1.

Figure 9:
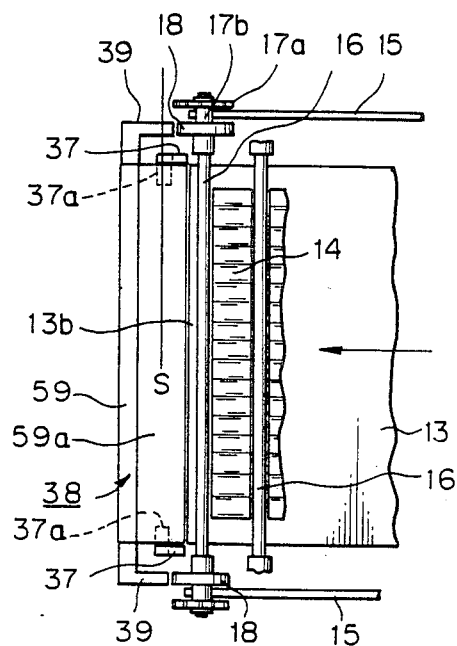
FIG. 9 is a plan view of a workpiece guide plate of the apparatus shown in FIG. 1, at a workpiece discharging side.

With the reference to FIGS. 1, 9, and 10, the apparatus 10 is provided with a workpiece receiving device 38 which receives the corrugated members 14 discharged from the discharging end 13b of the guide plate 13. The corrugated members 14 received in the workpiece receiving device 38 can be discharged therefrom, for example, by means of a pusher 65 which is connected to a piston rod 69 of a cylinder actuator 67, in the direction S in FIG. 1. The corrugated members 14 discharged from the workpiece receiving device 38 are, for example, fed to an assembly station of cores for a heat exchanger. Such an assembly station is described in detail, for example in U.S. Pat. No. 4,486,933.

Figure 10A:
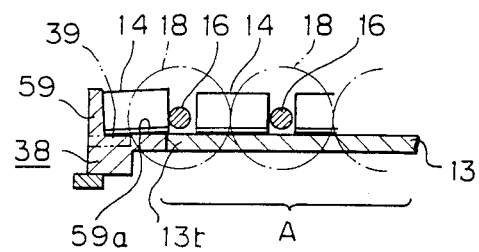
FIGS. 10A, 10B, and 10C are schematic sectional views of the apparatus shown in FIG. 1, for explaining the receiving operations of the corrugated members and the conveyance bars at different positions.

As can be seen from FIG. 10A, the workpiece receiving device 38 is comprised of a generally L-shaped body plate 59 movable up and down between a first position in which a receiving surface 59a of the device 38 is flush with the surface of the guide plate 13 at the discharging end 13b, and a second position which is located above the first position. The workpiece receiving device 38 has stops 39 integral therewith which are located at the opposite lateral sides of the body plate 59 to stop the movement of the frontmost bars 16 at the discharging end 13b of the guide plate 13, when the workpiece receiving device is in the first position. Namely, in the first position of the workpiece receiving device 38, the bars 16 come to a stop when the flanges 18 of the bars 16 come into contact with the stops 39. Alternatively, it is also possible to provide the stops 39 as separate pieces from the workpiece receiving device 38 on the lateral sides of the guide plate 13 at the discharging end 13b so as to move up and down between the first and second positions.

The bar receiving device 37 has a generally U-shaped body frame 58 which is supported by thrust bearings 40 so as to move up and down in the direction R in FIG. 1. The movement of the frame 58 is carried out by, for example, a cylinder actuator 61 which has a piston rod 41 connected to the frame 58. In this embodiment, the bar receiving device 37 receives the frontmost bar 16 when the workpiece receiving device 38 is in the second position above the first position, as will be apparent below.

Figure 10B:
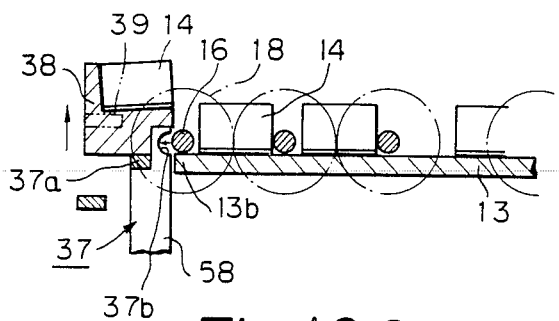
Figure 10C:
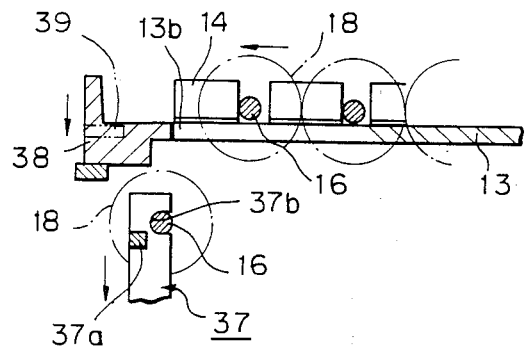

The receiving operations of the corrugated members and the conveyance bars are as follows, with reference to FIGS. 10A to 10C.

As shown in FIG. 10A, when the frontmost conveyance bar 16 moves to a position in which the associated corrugated member 14 is received in the workpiece receiving device 38, the flanges 18 of the frontmost bar 16 come into contact with the stops 39 of the receiving device 38 to stop the movement of the bar 16. When the frontmost bar 16 stops, the subsequent bars 16 successively stop, since the flanges 18 of the subsequent bars 16 successively come into collision with the preceding adjacent flanges of the preceding adjacent bars. This results in a stock of the conveyance bars 16 and, accordingly, the corrugated members 14 in the area A at the discharging end 13b of the guide plate 13. Namely, the corrugated members 14 are stocked between the associated front and rear conveyance bars 16. It should be noted that when the corrugated members 14 are stocked between the associated bars 16, no external force is supplied to the corrugated members, since there are provided between the adjacent bars 16 spaces having a distance defined by the adjacent flanges 18 contacting each other and larger than the width of the corrugated members.

When the workpiece receiving device 38 is in the first position shown in FIG. 10A, the receiving surface 59a thereof is flush with the upper surface of the guide plate 13, as mentioned before. Accordingly, the corrugated members located on the guide plate 13 can be easily and smoothly fed onto the receiving surface 59a of the workpiece receiving device 38. In other words, the receiving surface 59a constitutes a smooth extension of the upper surface of the guide plate 13 when the workpiece receiving device 38 is in the first position. After that, the bar receiving device 37 moves upward as shown in FIG. 10B, by the operation of the actuator 61, for example, in response to an output signal $S_0$ from a core assembly station as disclosed in the aforementioned U.S. Pat. No. 4,486,933. The upward movement of the bar receiving device 37 causes the workpiece receiving device 38 to move upward, since projections 37a which are provided on the body frame 58 of the bar receiving device 37 come into contact with the bottom surface of the body plate 59 of the workpiece receiving device 38. When the workpiece receiving device 38 moves upward, the stops 39 separate from the flanges 18 of the frontmost bar 16. As soon as the stops 39 separate, the frontmost bar 16 move forward again by the chains 23 and comes in recesses 37b which are provided on the upright frames of the body frame 58 of the bar receiving device 37 and which are in alignment with the bars 16 when the bar receiving device 37 moves upward, i.e., the workpiece receiving device 38 comes to the second position, shown in FIG. 10B. The corrugated members 14 received in the workpiece receiving device 38 can be discharged therefrom in the direction S(FIG. 1), for example, by the pusher 65, as mentioned before.

Figure 11:
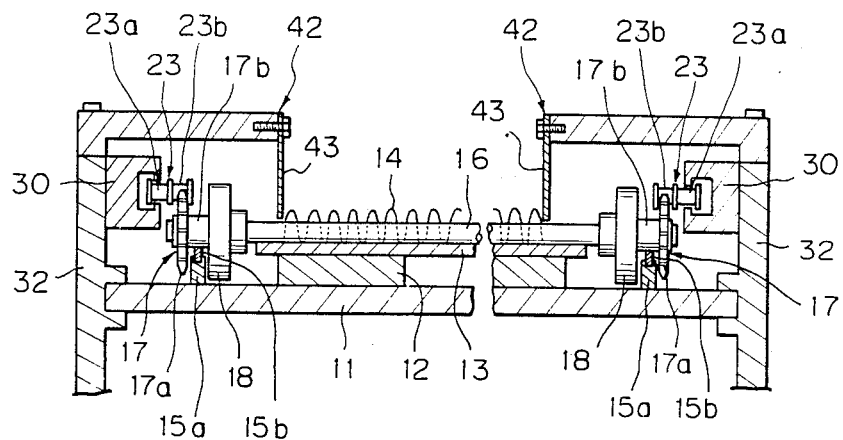
FIG. 11 is a sectional view of a main part of a conveying apparatus of corrugated members according to another embodiment of the invention.
Figure 12:
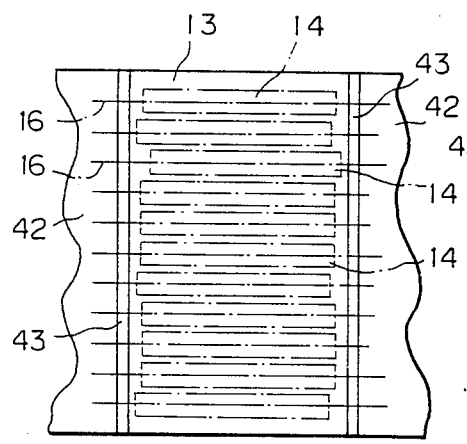
FIG. 12 is a schematic plan view of a main part of the apparatus shown in FIG. 11.

FIGS. 11 and 12 show a different embodiment of the present invention. In FIGS. 11 and 12, the elements corresponding to those in the first embodiment shown in FIGS. 1 to 9 are designated by the same numerical references.

In the second embodiment shown in FIGS. 11 and 12, a pair of guide devices 42 are secured to the base 11 above the guide plate 13 to guide the conveyance of the corrugated members 14 in the direction of the movement. The guide devices 42 have auxiliary guide plates 43 which are secured to the supports 32 and which extend in the direction of the conveyance of the corrugated members 14. The auxiliary guide plates 43 substantially lie in the vertical planes parallel to the direction of the movement of the corrugated members 14. Between the lower ends of the auxiliary guide plates 43 and the upper surface of the guide plate 13 are provided gaps which enable the conveyance bars 14 to pass therein. The height of the crests of the corrugated members 14 is larger than the diameter of the conveyance bars 14, so that the crests of the corrugated members can be brought into contact with the auxiliary guide plates 43. Namely, the corrugated members 14 can be located between the opposed auxiliary guide plates 43. The auxiliary guide plates 43 contribute to the prevention of accidental lateral movement of the corrugtated members 14 along the associated conveyance bars. That is, the corrugated members 14, which are relatively light in weight, tend to accidentally move in the lateral directions perpendicular to the conveyance direction of the corrugated members due to vibration, oscilations, or the like and tend to come out of the guide plate 13. However, according to the second embodiment shown in FIGS. 11 and 12, the corrugated members 14 can be prevented from such accidental lateral movement along the associated conveyance bars 14 by the auxiliary guide plates 43 of the guide devices 42.

Figure 13:
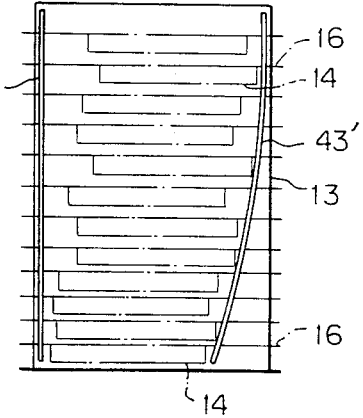
FIG. 13 is a view similar to FIG. 12, but showing a variant of a guide plate shown in FIGS. 11 and 12.

. Alternatively, it is also possible to provide a pair of auxiliary guide plates 43 at least one of which is curved, as shown in FIG. 13. The smoothly bent auxiliary guide plate 43' defines, together with the remaining auxiliary guide plate 43, a passage of the corrugated member which has a width decreasing toward the front in the direction of the conveyance of the corrugated members 14. The provision of the pair of auxiliary guide plates 43, which define a passage of the corrugated members which has a width gradually decreasing viewed in the direction of conveyance, ensures that the corrugated members can be always positioned at a predetermined discharging position when they arrive at the discharging end 13b of the guide plate 13.

The present invention is not limited to the aforementioned embodiments and can be modified without deviating from the scope thereof. For example, it is also possible to secure the workpiece receiving device 38 to the base 11 in such a way that there is between the receiving surface 59a of the workpiece receiving device 38 and the discharging end 13b of the guide plate 13 a small gap which is small enough only to permit the passage of the bars 16. In this alternative, since the workpiece receiving device 38 is immovable, the stops 39 must be separate from the workpiece receiving device 38 so as to move to come into contact with and separate from the flanges 18 of the frontmost bars 16. So long as the diameter of the bars is small, the gap between the discharging end 13b of the guide plate 13 and the workpiece receiving device 38 can be small. Accordingly, the gap does not hinder smooth transfer of the bars from one the guide plate 13 onto the receiving surface 59a of the workpiece receiving device 38. The bars 16 can fall down through the gap when the stops are disengaged from the flanges 18 of the associated bars 16. Furthermore, means for returning the bars to the bar feeding device 19 beneath the guide plate 13 can be made by chains, belts, etc. independently from the endless chains 23.

As can be understood from the above discussion, according to the present invention, when the frontmost conveyance bar comes to a stop by the workpiece receiving device at the discharging end of the guide plate, the subsequent bars are forced to stop, since the flanges of the subsequent bars successively come into contact with the flanges of the preceding conveyance bars. Accordingly, the corrugated members can be stocked in the vicinity of the discharging end of the guide plate. During the stocking, the rolling wheels of the conveyance bars continue to rotate idly on the guide rails and accordingly, as soon as the frontmost bar is disengaged from the stops, the subsequent conveyance bars can move forward again. According to the present invention, since the distance between the adjacent bars is defined by the flanges of the adjacent bars and accordingly is kept constant, the corrugated members located between the adjacent bars are free from external force which otherwise would deform or destroy the corrugated members. Therefore, the corrugated members which have a predetermined number of crests and which are relatively weak can be stably and smoothly conveyed one by one in the direction perpendicular to the length thereof.

We claim:

1. An apparatus for conveying corrugated members comprising;
    a guide plate which has a receiving end for receiving the corrugated members and a discharging end for discharging the corrugated members which are conveyed on the guide plate from the receiving end to the discharging end;
    a pair of guide rails which are located at the lateral opposite sides of the guide plate and which extend in parallel with the guide plate;
    a number of conveyance bars which extend in a direction perpendicular to the conveyance direction of the corrugated members and which are provided, on their opposite ends, with rotatable rolling wheels which can roll on the associated guide rails and with flanges which are adapted to provide a predetermined space between the adjacent conveyance bars when the adjacent flanges of the adjacent conveyance bars come into contact with each other,
    a bar feeding device for feeding the conveyance bars onto the receiving end of the guide plate one by one to put the rolling wheels of the conveyance bars on the corresponding guide rails;
    means provided on the lateral sides of the guide plate for causing the rolling wheels to continuously rotate on the guide rails in order to roll the rolling wheels on the guide rails, thereby to move the conveyance bars along the guide plate in the direction perpendicular to the length of the corrugated members, resulting in the movement of the corrugated members by the associated conveyance bars in the same direction;
    a bar receiving device provided at the discharging end of the guide plate for receiving the frontmost conveyance bars to bring the same beneath the guide plate; and
    means for returning the conveyance bars brought beneath the guide plate to the bar feeding device.

2. An apparatus according to claim 1, further comprising means located in the vicinity of the receiving end of the guide plate for successively feeding the corrugated members onto the receiving end of the guide plate.

3. An apparatus according to claim 2, wherein said bar feeding device feeds the conveyance bars onto receiving end of the guide plate synchronously with the feed of the corrugated members by said means for successively feeding the corrugated members.

4. An apparatus according to claim 1, further comprising means in the vicinity of the discharging end of the guide plate for receiving the corrugated members discharged from the discharging end of the guide plate.

5. An apparatus according to claim 4, further comprising means for pushing away the corrugated members received in the receiving means of the corrugated members.

6. An apparatus according to claim 4, wherein said means for receiving the corrugated members has a receiving surface on which the corrugated members can be received.

7. An apparatus according to claim 6, wherein said means for receiving the corrugated members is capable of movement between a first position in which the receiving surface in flush with the guide plate so as to receive the corrugated members from the guide plate onto the receiving surface and a second position above the first position, in which the bar receiving device can receive the frontmost conveyance bars.

8. An apparatus according to claim 7, further comprising means for stopping the frontmost conveyance bars at a predetermined position when the receiving means of the corrugated members is in the first position, said stopping means being movable.

9. An apparatus according to claim 1, wherein said means for causing the rolling wheels to continuously rotate comprises endless belt means which over lie said rotatable wheels and come into engagement with the rolling wheels on the guide rails in order to move the conveyance bars from the receiving end toward the discharging end of the guide plate and vice versa when the conveyance bars are located above and beneath the guide plate, respectively.

10. An apparatus according to claim 9, wherein the portion of the endless belt means that is located beneath the guide plate constitutes said means for returning the conveyance bars.

* * * * *